US008055938B1

(12) United States Patent
Chatterjee et al.

(10) Patent No.: US 8,055,938 B1
(45) Date of Patent: Nov. 8, 2011

(54) PERFORMANCE IN VIRTUAL TAPE LIBRARIES

(75) Inventors: Paresh Chatterjee, Fremont, CA (US); Srikumar Subramanian, Fremont, CA (US); Suresh Grandhi, Fremont, CA (US); Srinivasa Rao Vempati, Milford, MA (US)

(73) Assignee: American Megatrends, Inc., Norcross, GA (US)

( * ) Notice: Subject to any disclaimer, the term of this patent is extended or adjusted under 35 U.S.C. 154(b) by 957 days.

(21) Appl. No.: 11/450,653

(22) Filed: Jun. 9, 2006

Related U.S. Application Data

(60) Provisional application No. 60/689,274, filed on Jun. 10, 2005, provisional application No. 60/689,587, filed on Jun. 10, 2005.

(51) Int. Cl.
*G06F 11/00* (2006.01)
(52) U.S. Cl. ........................ 714/6.24; 714/6.21
(58) Field of Classification Search ............ 714/6, 7, 714/6.21, 6.24; 711/114
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,392,244 A * | 2/1995 | Jacobson et al. | 711/114 |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 5,974,426 A | 10/1999 | Lee et al. | |
| 6,098,128 A | 8/2000 | Velez-McCaskey et al. | |
| 6,389,432 B1 * | 5/2002 | Pothapragada et al. | 707/205 |
| 6,985,995 B2 * | 1/2006 | Holland et al. | 711/114 |
| 7,127,557 B2 * | 10/2006 | Ito et al. | 711/114 |
| 7,373,366 B1 * | 5/2008 | Chatterjee et al. | 707/204 |
| 7,536,529 B1 | 5/2009 | Chatterjee et al. | |
| 2002/0161983 A1 | 10/2002 | Milos et al. | |
| 2003/0163630 A1 | 8/2003 | Aasheim et al. | |

(Continued)

OTHER PUBLICATIONS

Hough, Geoffrey; 3PAR Thin Provisioning, Eliminating Allocated—But—Unused Storage and Accelerating ROI, 3PAR, Jun. 2003, pp. 1-14.*

(Continued)

*Primary Examiner* — Joshua Lohn
(74) *Attorney, Agent, or Firm* — McKeon, Meunier, Carlin & Curfman, LLC

(57) ABSTRACT

A method, system, apparatus, and computer-readable medium are provided for storing data at a virtual tape library ("VTL") computer or server. According to one method, a VTL computer maintains one or more storage volumes for use by initiators on an array of mass storage devices. Space on each of the volumes is allocated using thin provisioning. The VTL computer may also include a cache memory that is at least the size of a full stripe of the array. Write requests received at the VTL computer are stored in the cache memory until a full stripe of data has been received. Once a full stripe of data has been received, the full stripe of data is written to the array at once. The array utilized by the VTL computer may include a hot spare mass storage device. When a failed mass storage device is identified, only the portions of the failed device that have been previously written are rebuilt onto the hot spare. The array may be maintained using RAID-5. If one of the mass storage devices in the array fails, any subsequent writes directed to the array may be stored using RAID-0.

8 Claims, 11 Drawing Sheets

U.S. PATENT DOCUMENTS

| | | | | |
|---|---|---|---|---|
| 2004/0210731 | A1* | 10/2004 | Chatterjee et al. | 711/165 |
| 2004/0230766 | A1* | 11/2004 | Cameron | 711/203 |
| 2005/0114598 | A1* | 5/2005 | Hartung et al. | 711/114 |
| 2005/0182992 | A1* | 8/2005 | Land et al. | 714/701 |
| 2005/0257083 | A1* | 11/2005 | Cousins | 714/6 |
| 2006/0031468 | A1* | 2/2006 | Atluri et al. | 709/224 |
| 2006/0080505 | A1* | 4/2006 | Arai et al. | 711/114 |
| 2006/0112221 | A1* | 5/2006 | Hu et al. | 711/114 |
| 2006/0143418 | A1* | 6/2006 | Takahashi et al. | 711/165 |

OTHER PUBLICATIONS

Hough, Geoff; 3PAR Utility Storage, Benefits Summary; 3PAR; Jun. 2003, pp. 1-11.*

Chen, et al., RAID: High-Performance, Reliable Secondary Storage, 1997, Association for Computing Machinery, pp. 1-41.*

U.S. Appl. No. 11/254,347, filed Oct. 20, 2005, entitled "Method, System, Apparatus, And Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Official Action dated Oct. 8, 2008 in U.S. Appl. No. 11/254,347.

U.S. Notice of Allowance / Allowability dated Jan. 12, 2009 in U.S. Appl. No. 11/254,347.

U.S. Appl. No. 12/425,123, filed Apr. 16, 2009, entitled "Provisioning Space in a Data Storage System," Inventors: Chatterjee et al.

* cited by examiner

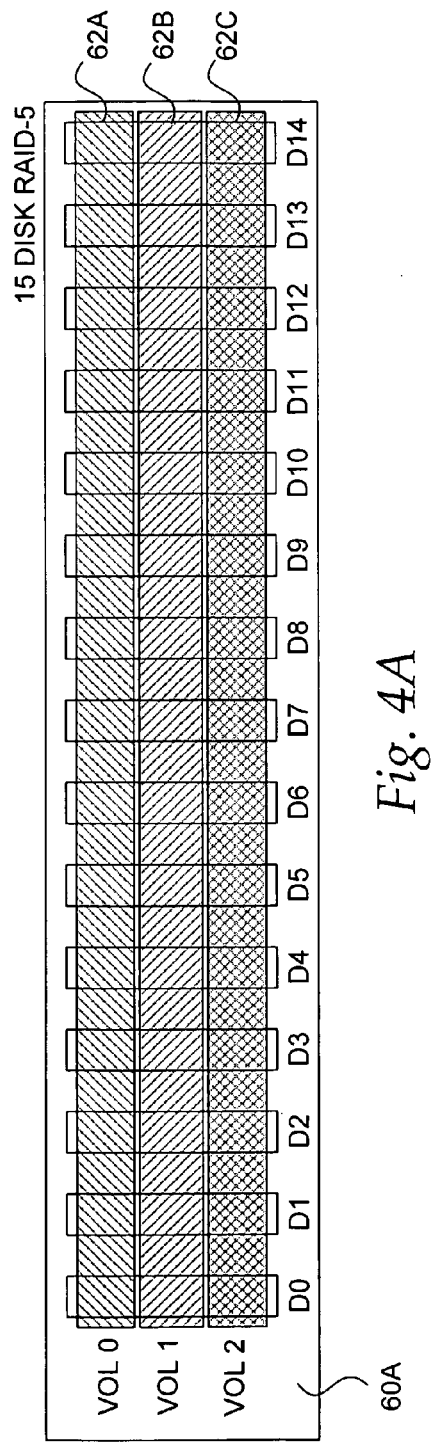
Fig. 4A
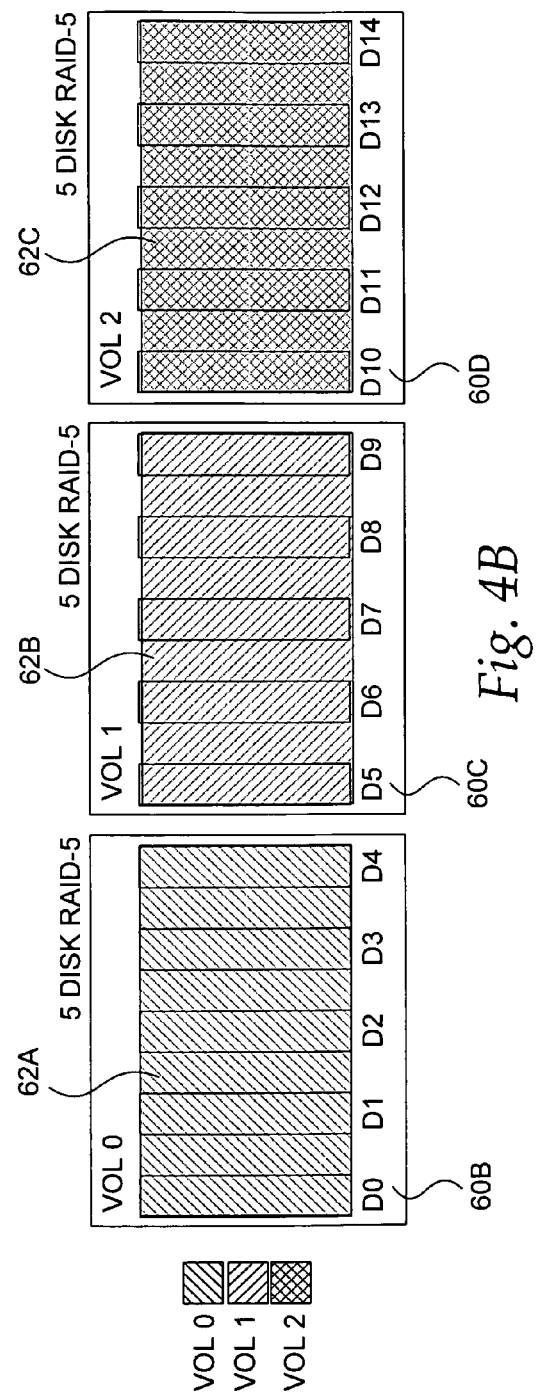
Fig. 4B
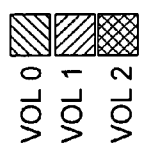

PERFORMANCE IN VIRTUAL TAPE LIBRARIES

CROSS-REFERENCE TO RELATED APPLICATIONS

This application claims the benefit of U.S. provisional patent application No. 60/689,274, filed on Jun. 10, 2005 and entitled "A Novel Method of Implementing a Virtual Tape Library," and U.S. provisional patent application No. 60/689,587, also filed on Jun. 10, 2005 and entitled "A Novel Method of Provisioning Storage Space Amongst Different Volumes in a Storage System," both of which are expressly incorporated herein by reference in their entirety.

BACKGROUND

In a traditional server tape backup system, a backup server moves data from one or more application servers to a set of tape drives based on a backup schedule. Once a backup event has been completed, the tapes on which the backup has been made are transferred to a tape vault, where they are physically archived. In the event of a system failure, or data loss, data may be restored from the tape vault to an application server. This process involves physically searching the tape vault to identify the correct restore point, transporting the appropriate tape back to the server room, and restoring the appropriate data. Due to the number of steps involved, this type of restore process can take several hours and, in some cases, even longer. This extended length of time can be unacceptable in highly available systems.

Virtual tape libraries are increasingly being used to supplement traditional tape libraries with the primary purpose of reducing the time that is required to restore the contents of a backup tape. In a virtual tape library, a disk array replaces the tape library. The disk array exposes a storage area network interface through which a backup server may connect to it. Each tape drive of the tape library is replaced by a volume, which is exposed as a storage target. The application servers connect to their corresponding targets and proceed to back up data under the direction of the backup server. Since disk technology is faster than tape technology, a well-designed virtual tape library can offer superior performance to a tape for backup, and performance that is orders of magnitude higher for the restoration of backed up data. However, current virtual tape libraries still suffer from performance limitations during normal operation and also during anomalous situations, such as drive failure.

It is with respect to these considerations and others that the present invention has been made.

SUMMARY

The above and other problems are solved by a method, system, apparatus, and computer-readable medium for storing data at a virtual tape library ("VTL") computer. Through the embodiments provided herein, data can be stored at a VTL computer in a manner that avoids the performance penalties associated with previous virtual tape library solutions.

According to one method provided by an implementation described herein, a VTL computer maintains one or more storage volumes for use by initiators on an array of mass storage devices. Space on each of the volumes is allocated using thin provisioning. Thin provisioning refers to the process of allocating storage space on the array for write requests as they are received, usually in a sequential manner. In this way, data is stored in the allocated space on the array in the same order as data write requests arrive at the volumes. Thin provisioning the array maintained by the VTL in this manner removes the explicit arrangement of data in discrete regions of the disk and allows multiple parallel backup operations to become fundamentally sequential instead of piecewise-sequential. This leads to a significant performance boost as compared to previous solutions.

According to other aspects of one method, the VTL computer may also include a cache memory that is at least the size of a full stripe of the array for RAID-5 and RAID-6 arrays. Write requests received at the VTL computer are stored in the cache memory until a full stripe of data has been received. Once a full stripe of data has been received, the full stripe of data is written to the array at once. By caching write requests until a full stripe of data has been received, the performance degradation caused by RAID-5 or RAID-6 write cycles in previous virtual tape libraries is avoided.

According to other aspects of a method provided herein, the array utilized by the VTL computer may include a hot spare mass storage device. The hot spare mass storage device is an extra mass storage device that is utilized in the event of a failure of one of the mass storage devices in the array. According to aspects of the method, when a failed mass storage device is identified, only the portions of the failed device that have been previously written are rebuilt onto the hot spare. The unwritten portions need not be rebuilt, which accelerates the time for recovering from disk failure. Additionally, because thin provisioning guarantees that space is allocated sequentially on the array, write requests directed to the unwritten portion of the failed mass storage device can be processed and stored on the hot spare in a non-degraded manner.

According to other aspects of one method, the array is maintained by the VTL computer using a redundant array of inexpensive disks ("RAID") storage mechanism. In particular, the array may be maintained using RAID-5 . If one of the mass storage devices in the array fails, any subsequent writes directed to the array may be stored using RAID-0. In this manner, the array is switched dynamically from a RAID-5 array to a RAID-0 array when a device in the array fails. Since a RAID-0 array and a degraded RAID-5 array provide the same amount of data redundancy, it is not necessary for the array to switch into a degraded mode of operation and writes received after the device failure can be processed in a non-degraded manner. Metadata may be stored in a configuration area of the array indicating a location on the array where the array was converted from a RAID-5 array to a RAID-0 array.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 4A-4B are block diagrams illustrating the organization of data on a 15 disk array and on three five disk arrays, respectively;

DETAILED DESCRIPTION

Figure 1:
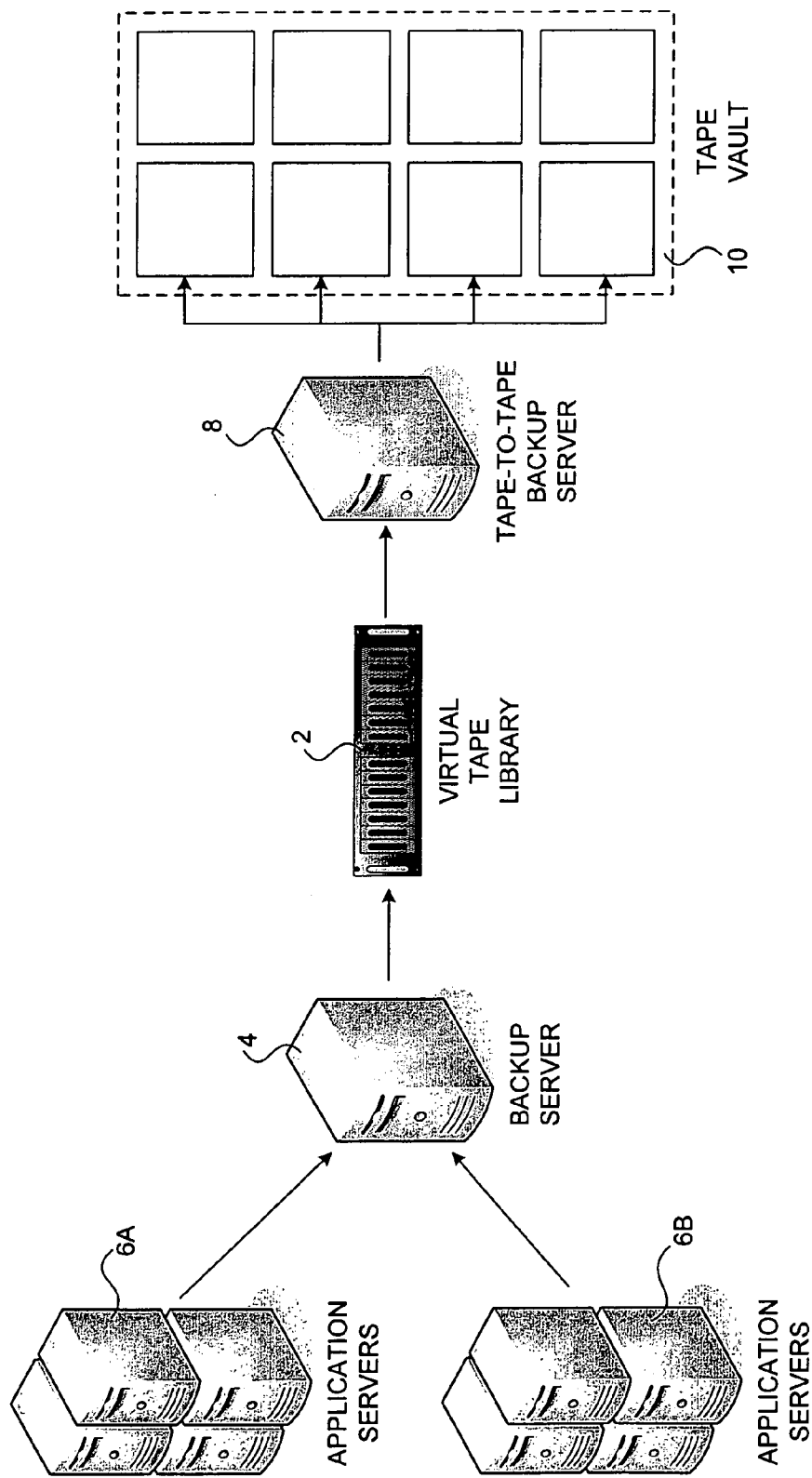
FIG. 1 is a network diagram showing an illustrative operating environment for the implementations described herein.

Embodiments of the present invention provide a method, system, apparatus, and computer-readable medium for storing data at a VTL computer. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
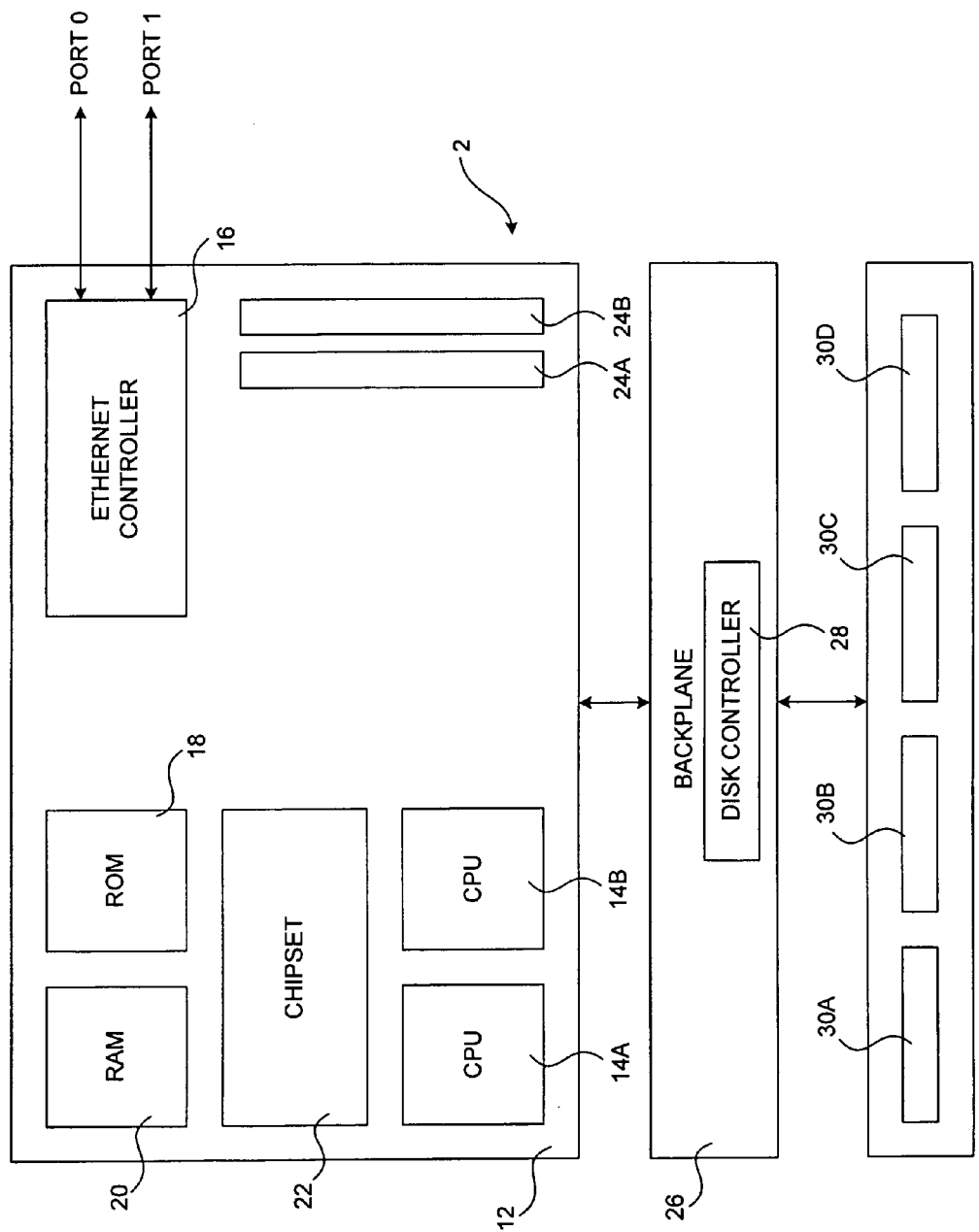
FIG. 2 is a computer architecture diagram showing an illustrative computer architecture for a VTL computer provided herein.
Figure 3:
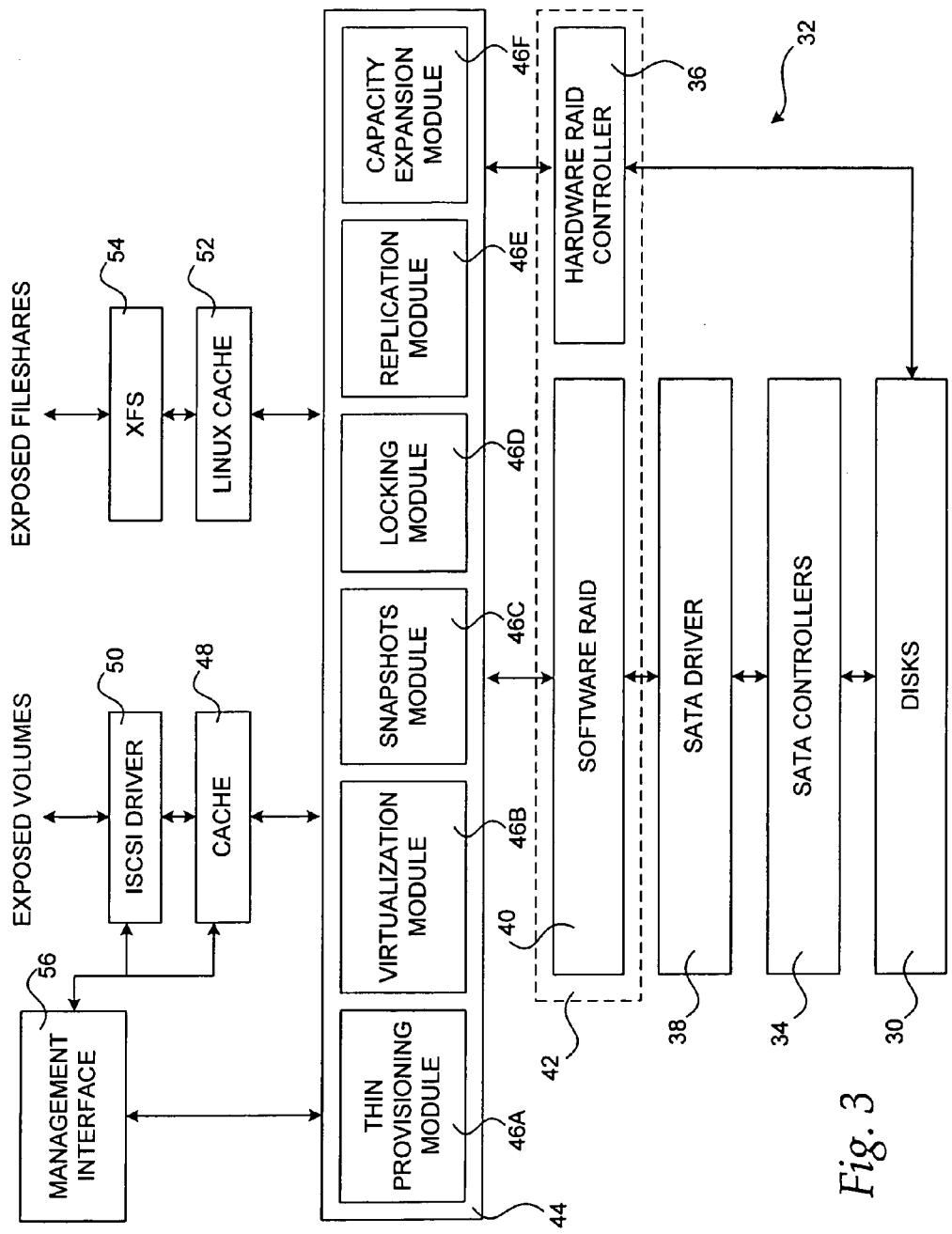
FIG. 3 is a software architecture diagram showing aspects of a storage stack utilized by the VTL computer provided herein.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment will be described for the various implementations described herein. As shown in FIG. 1, the embodiments described herein may be implemented in a VTL computer 2 that is operative to receive and respond to requests to read and write data to an array of mass storage devices, such as hard disk drives. According to embodiments of the invention, the VTL computer 2 may be housed in a one rack space unit storing up to four hard disk drives or alternatively may be housed in a three rack space unit storing up to fifteen hard disk drives. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the VTL computer 2 includes one or more network ports operatively connected to a network switch using appropriate network cabling. It should be appreciated that, according to embodiments of the invention, Ethernet or Gigabit Ethernet may be utilized. However, it should also be appreciated that other types of suitable physical connections may be utilized to form a network of which the VTL computer 2 is a part. The VTL computer 2 is connected to a backup server 4 which, in turn, is connected to one or more application servers 6A-6B (also referred to herein as "initiators"). It should be appreciated that other types of networking topologies may be utilized to interconnect the application servers 6A-6B, backup server 4, and the VTL computer 2. It should also be appreciated that the backup server 4 and the application servers 6A-6B may be connected to the same local area network ("LAN") as the storage VTL computer 2 or may be connected via a distributed wide area network, such as the Internet. An appropriate protocol, such as the Internet Small Computer Systems Interface ("iSCSI") protocol or the Serial Attached SCSI ("SAS") protocol may be utilized to enable the application servers 6A-6B to communicate with and utilize the various functions of the backup server 4 and the VTL computer 2 over a wide area network such as the Internet.

According to the various implementations presented herein, the VTL computer 2 replaces the physical tape library utilized in typical tape backup systems. To accomplish this, the VTL server 2 exposes a storage area network ("SAN") interface through which the backup server 4 may connect to it, such as iSCSI. Each tape of the traditional tape library is replaced by a storage volume maintained by the VTL computer 2. In one implementation, the volumes are exposed as iSCSI targets. The application servers 6A-6B connect through iSCSI initiators to their corresponding targets and proceed to back up data onto the VTL computer 2 under the direction of the backup server 4. Since disk technology is much faster that tape technology, a well-designed virtual tape library can offer superior performance to a tape for backup, and performance that is orders of magnitude higher for restoration of backed up data.

For various regulatory and legal reasons, it may be necessary to continue backing data up onto tapes that can be stored in a tape vault at a remote location. As a result, the VTL computer 2 exposes each of its volumes to a tape-to-tape backup server 8. The tape-to-tape backup server 8 backs up the data on the disk array maintained by the VTL computer 2 to tapes. In one implementation, the same server computer that performs the application backup may also perform the tape-to-tape backup process. These tapes are then stored in a tape value 10. Although backups are still made to tapes, data restore operations utilized the data stored at the VTL computer 2 to restore at a much higher speed than available from tape. Additional details regarding the operation of the VTL computer 2 are provided below.

Turning now to FIG. 2, an illustrative computer hardware architecture will be described for practicing the various implementations presented herein. In particular, FIG. 2 shows an illustrative computer architecture and implementation for the VTL server computer 2. In particular, the VTL server computer 2 includes a baseboard 12, or "motherboard", which is a printed circuit board to which a multitude of components or devices may be connected by way of a system bus or other electrical communication path. In one illustrative embodiment, these components include, without limitation, one or more central processing units ("CPU") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the VTL server computer 2. It should also be appreciate that, although not illustrated in FIG. 2, a RAID controller is also usually embedded on the motherboard 12 or implemented in software by the VTL server computer 2. A serial attached SCSI ("SAS") controller may also be embedded in the motherboard 12. It is also contemplated that the VTL server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the VTL server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the VTL server computer 2 may include including a RAM 20 and a ROM 18. The ROM 18 may store a basic input/output system or Extensible Firmware Interface ("EFI") compatible firmware that includes program code containing the basic routines that help to transfer information between elements within the VTL server computer 2. As also described briefly above, the Ethernet controller 16 may be capable of connecting the VTL server computer 2 to the application servers 6A-6B, the backup server 4, and the tape-to-tape backup server 8 via a network. Connections which may be made by the network adapter may include local area network LAN or WAN connections. LAN and WAN networking environments are commonplace in offices, enterprise-wide computer networks, intranets, and the Internet. The CPUs 14A-14B utilized by the VTL server computer 2 are standard central processing units that perform the arithmetic and logical operations necessary for the operation of the VTL server computer 2. CPUs are well-known in the art, and therefore not described in further detail herein. A graphics adapter may or may not be utilized within the VTL server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 30A-30D or other types of high capacity high speed storage. The mass storage devices may store an operating system suitable for controlling the operation of the VTL server computer 2, such as the LINUX operating system. The hard disk drives may also store application programs and virtually any other type of data. It should be appreciated that the operating system comprises a set of programs that control operations of the VTL server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the VTL server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture will be described for practicing the various implementations presented herein. In particular, FIG. 3 illustrates a storage stack 32 utilized in the embodiments of the invention. At the top of the storage stack 32, storage volumes or fileshares are exposed to the application servers 6A-6B, the backup server 4, and the tape-to-tape backup server 8. At the bottom of the storage stack 32 are the actual mass storage devices, such as the disks 30A-30B, that are utilized to store the data. The mass storage devices are, in turn, connected to a disk controller, such as a Serial ATA ("SATA") controller 34 or a hardware RAID controller 36. In the case of a SATA controller, a SATA driver 38 may be utilized to access the hardware device. Additionally, a software RAID module 40 may also be utilized to provide RAID services in the absence of a hardware RAID controller 36. A unified RAID management layer 42 may be utilized to simplify the utilization of RAID with either software or hardware implementations.

Above the unified RAID management layer 42 sits a kernel module 44 that implements the functions described herein. In particular, the kernel module 44 may provide functionality for implementing thin provisioning, virtualization, snapshots, locking, replication, and capacity expansion. These features are implemented by the modules 46A-46F, respectively, and some of which are described in greater detail herein. In particular, the thin provisioning module 46A provides the functionality described herein for allocating physical capacity to logical volumes on an as-needed basis. The virtualization module 46B provides the facility to expand a volume into multiple servers, and to treat multiple servers as a single large storage device. The snapshots module 46C provides functionality for creating and utilizing point in time snapshots of the contents of logical storage volumes. The locking module 46D provides functionality for synchronizing input/output operations in a computer system that utilizes snapshots. The replication module 46E provides functionality for replication within the computer 2. The capacity expansion module 46F provides functionality for adding storage capacity to the computer 2. It should be appreciated that some of the modules 46A-46D may not be utilized by the server computer 2.

Above the kernel module 44, a number of software components are utilized depending upon the access mechanism utilized to access the data stored on the hard disk drives 30. In particular, a SAN path is provided that utilizes a cache 48 and a Internet iSCSI driver 50. A NAS path is also provided that utilizes a LINUX cache 52 and the XFS high-performance journaling file system 54. Volumes are exposed through the SAN path while fileshares are exposed through the NAS path. According to the various implementations provided herein, a management interface 56 may also be provided for controlling and monitoring the various aspects of the present invention. The management interface communicates with the various layers through software interfaces to retrieve performance data, provide configuration data, and to perform other functions.

It should be appreciated that the device driver 44 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash. The invention may also be implemented on a multitude of processor families, including the INTEL x86 family of processors, the INTEL XSCALE family of processors, or the IBM POWERPC family of processors.

Referring now to FIGS. 4A and 4B, additional details will be provided regarding several methods of organizing data on arrays maintained by the VTL server computer 2. In particular, as described above, the array of mass storage devices maintained by the VTL server computer 2 is utilized to store backed-up data. Hence, a minimum amount of data protection through redundancy is required. Accordingly, it is not unusual for virtual tape libraries to utilize RAID for managing the disk array. The most common RAID level is RAID-5 due to the fact that it is able to provide redundancy at the expense of a single disk. A RAID-5 array uses block-level striping with parity data distributed across all member disks of the array.

FIGS. 4A and 4B show arrays 60A-60D maintained by a VTL server computer 2 that contains 15 hard disk drives (D0-D14), into which data is to be backed up from three different application servers. The arrays, therefore, expose three volumes 62A-62C for backing up data from each of the application servers, respectively. There are several alternatives for organizing RAID onto the disk drives D0-D14. The first is shown in FIG. 4A, where all 15 disk drives (D0-D14) have been utilized to create the array 60A, with one of the 15 drives being redundant. Alternatively, FIG. 4B shows a method of creating arrays wherein three RAID-5 arrays 60B-60D have been created out of the 15 disk drives (D0-D14), each consisting of five disks.

Each of the alternatives for creating arrays shown in FIGS. 4A-4B has limitations. The alternative shown in FIG. 4A saves space and maximizes spindle utilizes because only one of the disks (D0-D14) is redundant. However, when all three volumes are written to simultaneously, significant head thrashing may occur because writes are being directed to three distinct regions of each disk. This causes a severe performance penalty, since piecewise sequential writes are essentially being converted to random head movements on the disks. The alternative shown in FIG. 4B avoids this performance penalty by creating three smaller RAID arrays 60B-60D. The problem with this alternative, however, is that it wastes one disk in every five for redundancy. Additionally, reads from such a configuration are slower because not all spindles on all disks are utilized.

The general technique of using a RAID-5 array transparent to the VTL server computer 2 also has other performance issues, regardless of which of the alternatives shown in FIGS. 4A-4B is chosen. For example, if one of the disks in the array fails, and a rebuild must be performed, the array acts as a degraded RAID-5 , in which the performance is even slower, and a rebuild to a hot spare or a new disk is performed in the background. As will be described in greater detail below, however the implementations described herein improve performance during normal conditions and also improved performance during anomalous situations, such as drive failure.

Figure 5:
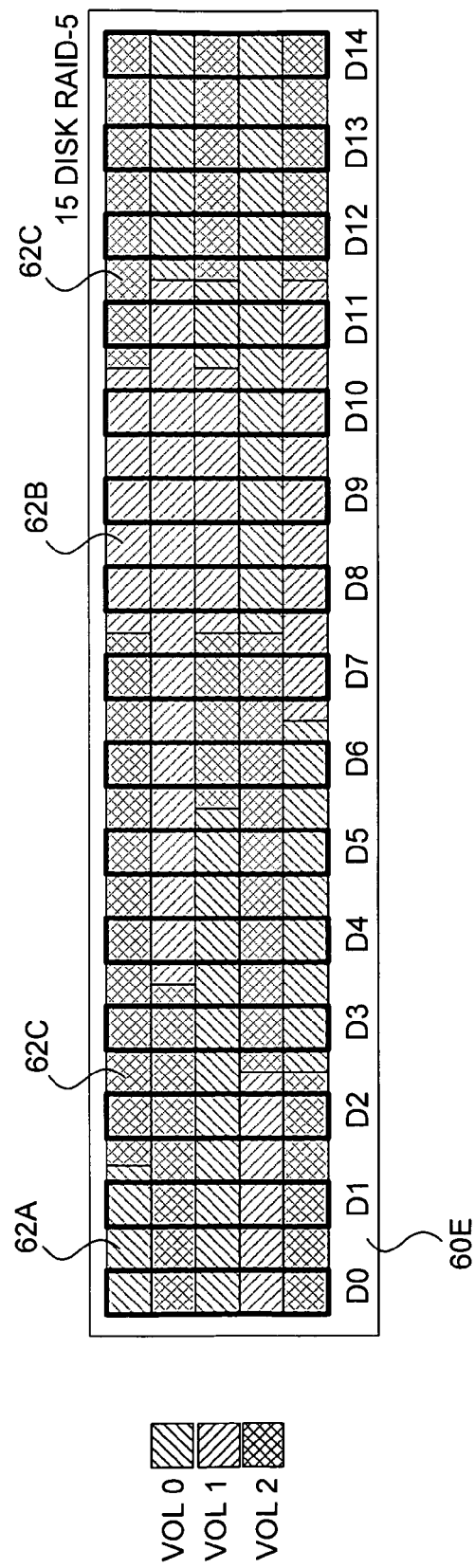
FIG. 5 is a block diagram illustrating the organization of data on a 15 disk array utilizing thin provisioning.

Turning now to FIG. 5, the organization of data on a disk array of the VTL server computer 2 utilizing thin provisioning will be described. In particular, FIG. 5 illustrates an array 60E that organizes all 15 disk drives (D0-D14) into three volumes 62A-62C using thin provisioning. Thin provisioning refers to a process of allocating storage space on the array 60E for write requests as they are received. Storage space is allocated sequentially to write requests in the order in which they are received. In this way, data is stored in the allocated space on the array in the same order as data write requests arrive at the volumes. For instance, in the example shown in FIG. 5, the first write to arrive at the array was a write to the volume 62A. The next write to arrive was to the volume 62C, the next write was to 62B, the next to 62C, and so on. Rather than being located at physically disparate locations on the array 60E, the data for each of the write operations is stored sequentially in the order that the writes were received.

Thin provisioning the array maintained by the VTL server computer 2 in this manner removes the explicit arrangement of data in discrete regions of the disk and allows backup operations to become fundamentally sequential. In order to provide this functionality, the thin provisioning module 46A maintains data structures describing the relationship between the logical areas of a storage volume and the physical areas on disk at which the data is actually stored. These data structures are utilized when performing read and write operations. Additional details regarding the thin provisioning mechanism utilized by the VTL server computer 2 described herein can be found in U.S. patent application Ser. No. 11/254,347, filed on Oct. 20, 2005, and entitled "Method, System, Apparatus, and Computer-Readable Medium for Provisioning Space in a Data Storage System," which is assigned to the same assignee of the instant application, and which is also incorporated herein by reference in its entirety.

Figure 6:
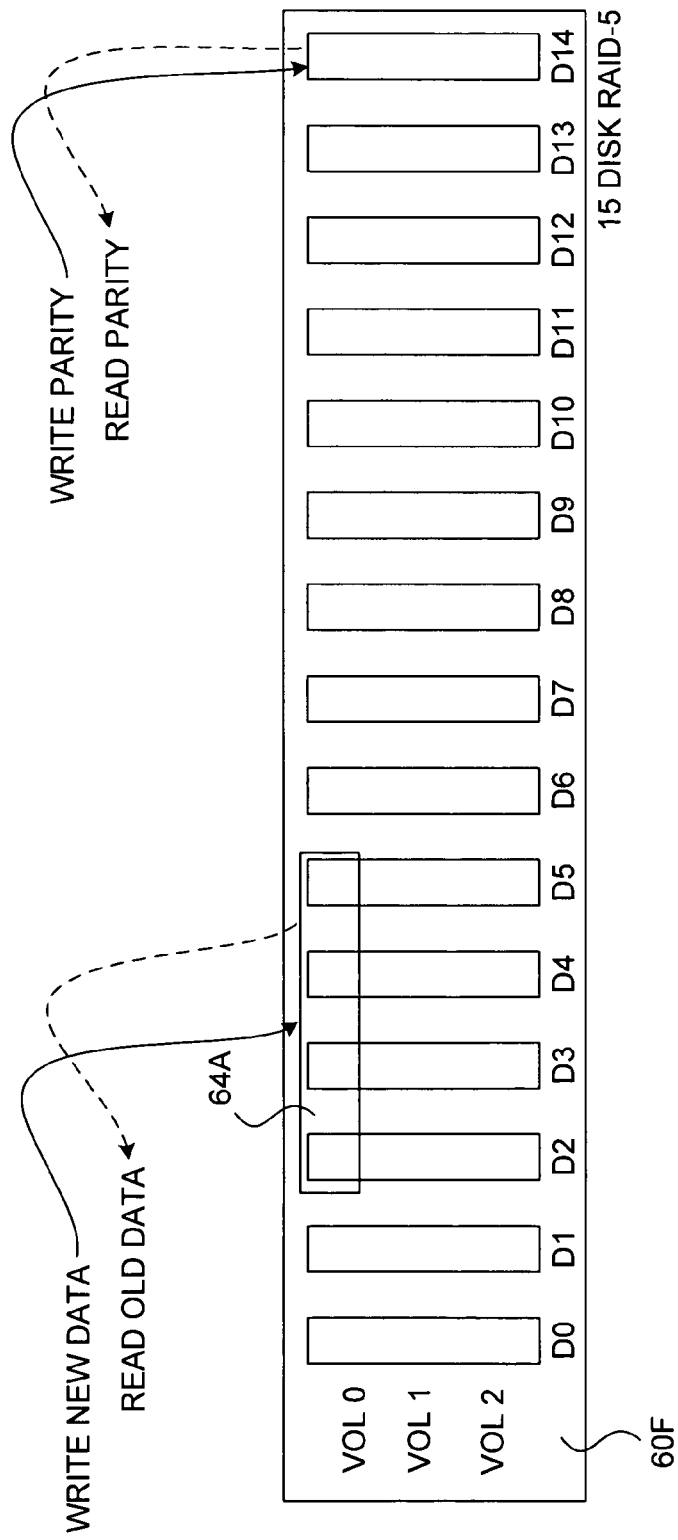
FIG. 6 is a block diagram illustrating the performance penalties incurred when storing data on an array using native RAID-5.

Referring now to FIG. 6, a block diagram will be described that illustrates the performance penalties incurred when storing data on an array using native RAID-5 . In particular, FIG. 6 illustrates the sequence of operations necessary to write new data to a RAID-5 configured array 60F. It should be appreciated that RAID-5 arrays are inherently slower than RAID-0 arrays. A RAID-0 array splits data evenly across two or more disks with no parity information for redundancy. The difference in speed is the result of the additional overhead necessary with a RAID-5 array for parity calculation and storage. The value for a parity block on a RAID-5 stripe is found by performing an exclusive-OR ("XOR") operation on all the corresponding blocks of the other disks in the array. The most common way of doing this is to read the old parity and the old data, use the new data to generate new parity data, and then to write the new data 64A and the new parity at the appropriate locations. As a consequence, each data write in a standard RAID-5 array has the overhead of two additional reads and one additional write. This is illustrated in FIG. 6.

Figure 7:
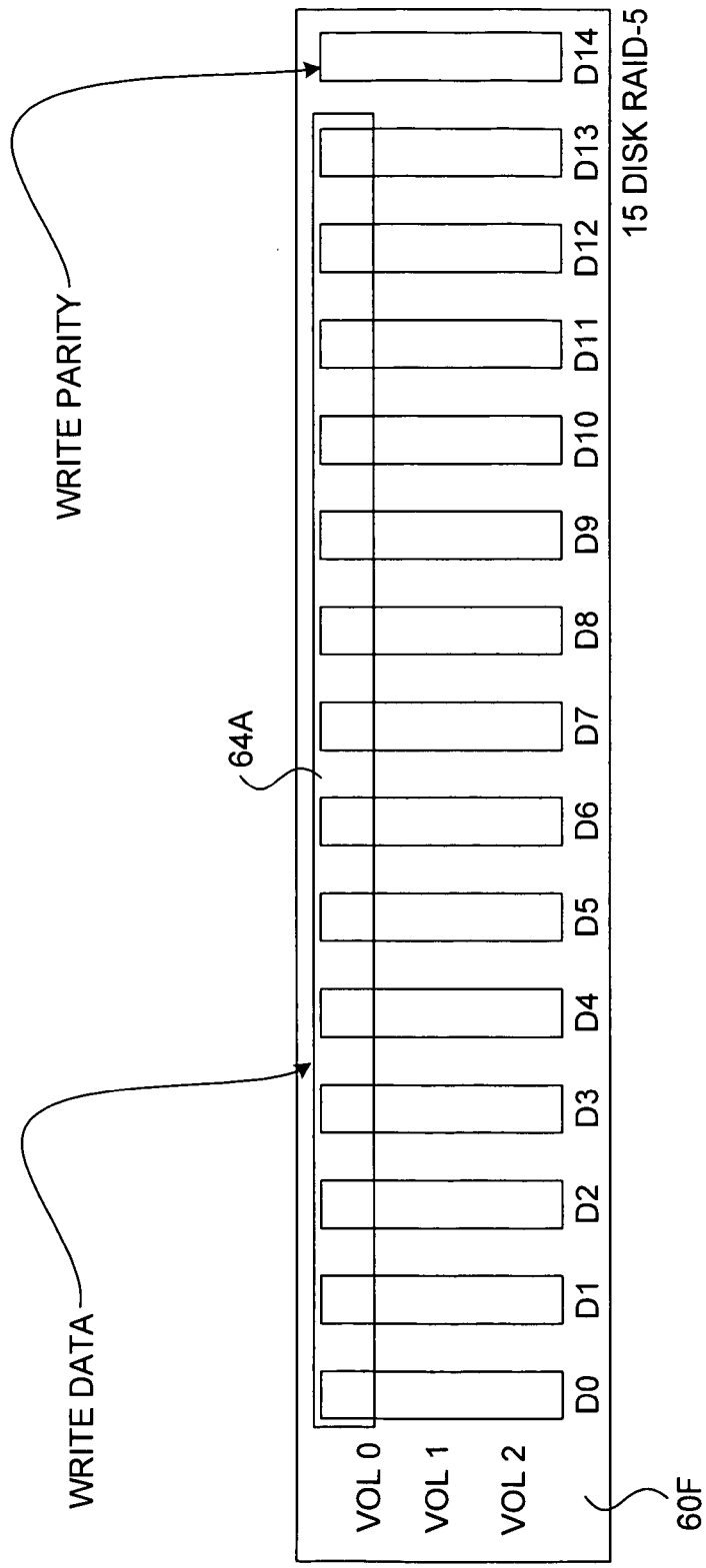
FIG. 7 is a block diagram illustrating the storage of a full stripe of data on a RAID array utilizing a cache memory.

FIG. 7 illustrates a method provided herein for mitigating the performance problems in RAID-5 arrays described above with respect to FIG. 6. This is accomplished by utilizing cache lines in the cache 48 of the VTL server computer 2 that are tuned to the size of a full stripe of the array 60F. Incoming write operations are stored in the cache lines until a full stripe has been received. At that time, the cache is flushed and an entire stripe of data is written to the array 60F at once. When an entire stripe is being written at once, parity can be calculated by performing the XOR operation on the new data directly, instead of having to read old data and old parity from the array first. For instance, as shown in FIG. 7, an entire stripe of data 64A is written to the array 60F at one time along with the appropriate parity data. Because thin provisioning is utilized on the volume, and therefore data writes are allocated to sequential locations on the array 60F, it is ensured that full stripe writes will be generated one after the other. This kind of caching improves performance dramatically in a virtual tape library system.

Figure 8:
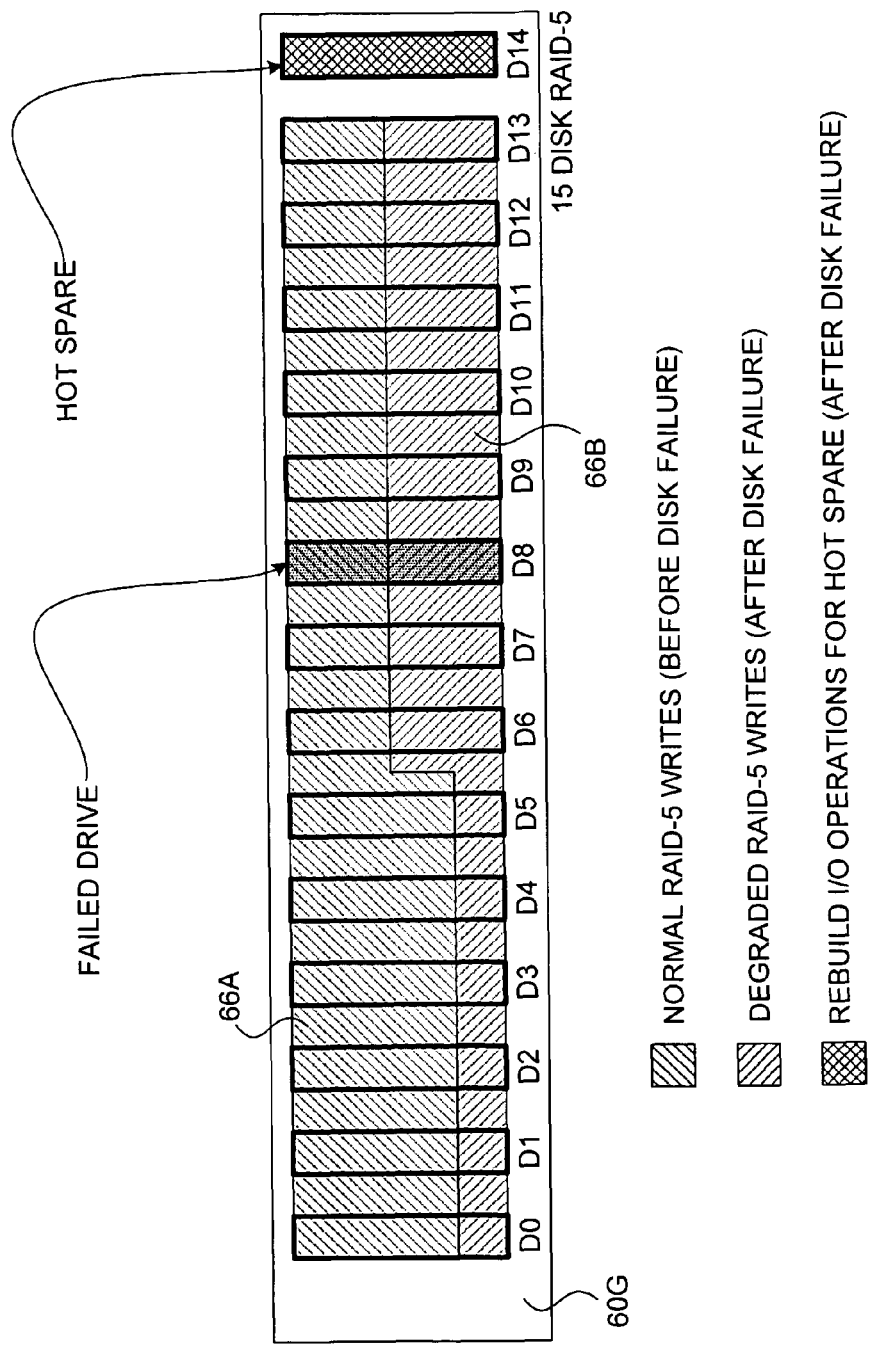
FIG. 8 is a block diagram illustrating a method of rebuilding a hot spare device in the presence of input/output operations.

Referring now to FIG. 8, a block diagram will be described illustrating a method of rebuilding a hot spare device in the presence of input/output operations. The disk drives comprising a storage system are often its weakest link. It is to be expected, therefore, that drive failures will occur regularly, but unpredictably. Through its redundancy features, RAID-5 supports recovery from the failure of one disk drive. In order to make the time before recovery as small as possible, arrays may utilize a spare disk drive that is not utilized in normal circumstances, but becomes a part of the array when another drive in the array fails. This device is typically called a "hot spare." In FIG. 8, the array 60G has 15 disk drives (D0-D14), with the drive D14 configured as the hot spare.

In the event of the failure of one of the disk drives in the array (drive D8, for instance), a rebuild process is started that rebuilds the failed drive onto the hot spare D14. In order to rebuild the contents of the data from the failed drive D8 onto the hot spare D14, data must be read from each of the other disks in the array and the appropriate data calculated for the hot spare D14. While hot spare rebuilding is ongoing, the array utilizes a degraded mode of operation for responding to input/output operations, which is several orders of magnitude slower than usual for large arrays. The degraded mode is utilized because the contents of the failed drive D8 must be calculated from the contents of the other drives each time a read or write operation is performed. The array is operated in degraded mode until the rebuild process is completed. Depending upon the capacity of the drives, the time for which degraded mode is active may be very large. With disk capacity continually increasing, this time is also expected to increase continuously.

Figure 9:
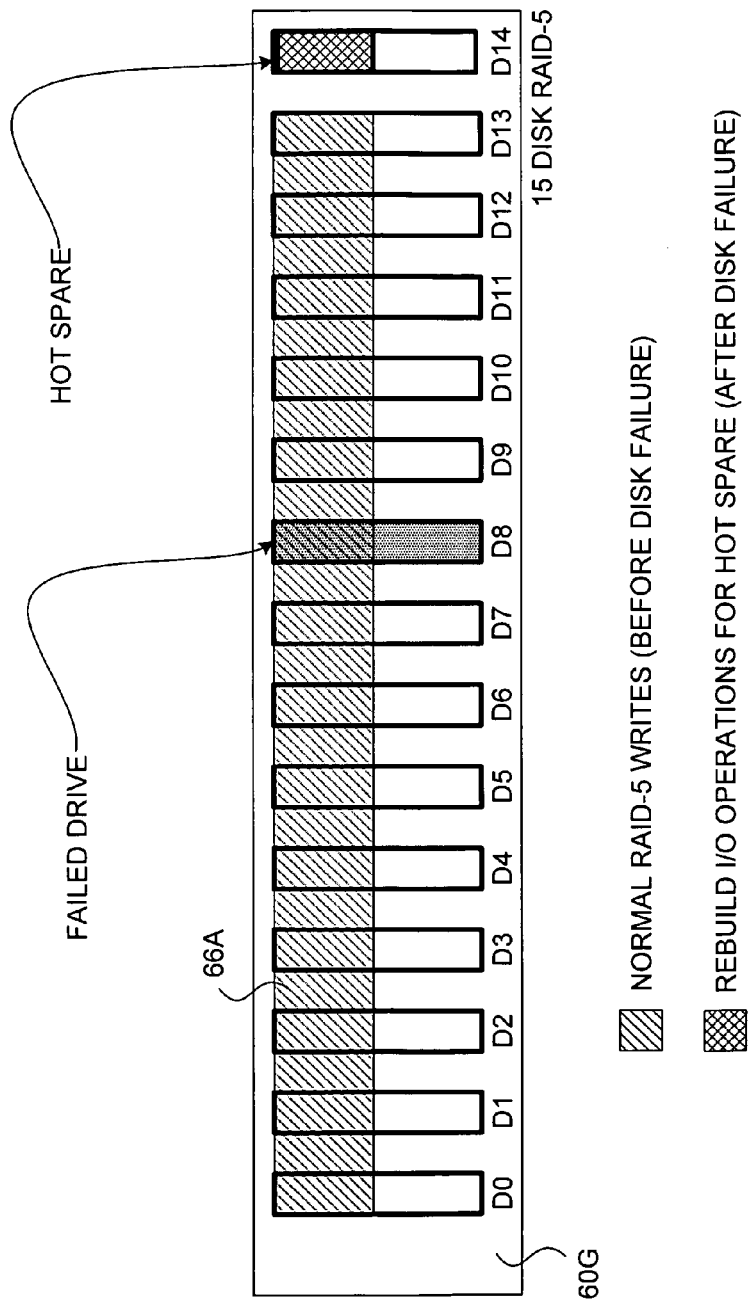
FIG. 9 is a block diagram illustrating a method of rebuilding only a portion of a hot spare device in a non-degraded mode and in the presence of input/output operations.

Turning now to FIG. 9, a block diagram will be described that illustrates a method of rebuilding only a portion of a hot spare device in a non-degraded mode and in the presence of input/output operations. In particular, FIG. 9 shows an array 60G on which data is allocated using thin provisioning and that has an installed hot spare D14. In the presence of the failure of the disk D8, the array 60G is considered to be only partially in need of a rebuild. Because data is allocated sequentially by the thin provisioning algorithm, space will be allocated on the disks from their beginning to the end. Space that has not yet been written to need not be rebuilt onto the hot spare D14.

In the event of a failure of the disk D8, sequential writes to the array 60G can continue in non-degraded mode, with the only difference being that the writes following the failure will utilize the hot spare D14 rather than the failed disk D8. Only the portion of the hot spare D14 that needs to be rebuilt is serviced by a rebuild thread executing on the VTL server computer 2. This eliminates the need for the array ever to go into degraded mode for normal writes and also accelerates the time for recovering from a disk failure.

While the rebuilding algorithm described above is specifically described with respect to a hot-spare, it is also applicable to the scenario of rebuilding a degraded RAID-5 array by adding an entirely new replacement drive to the array.

Figure 10:
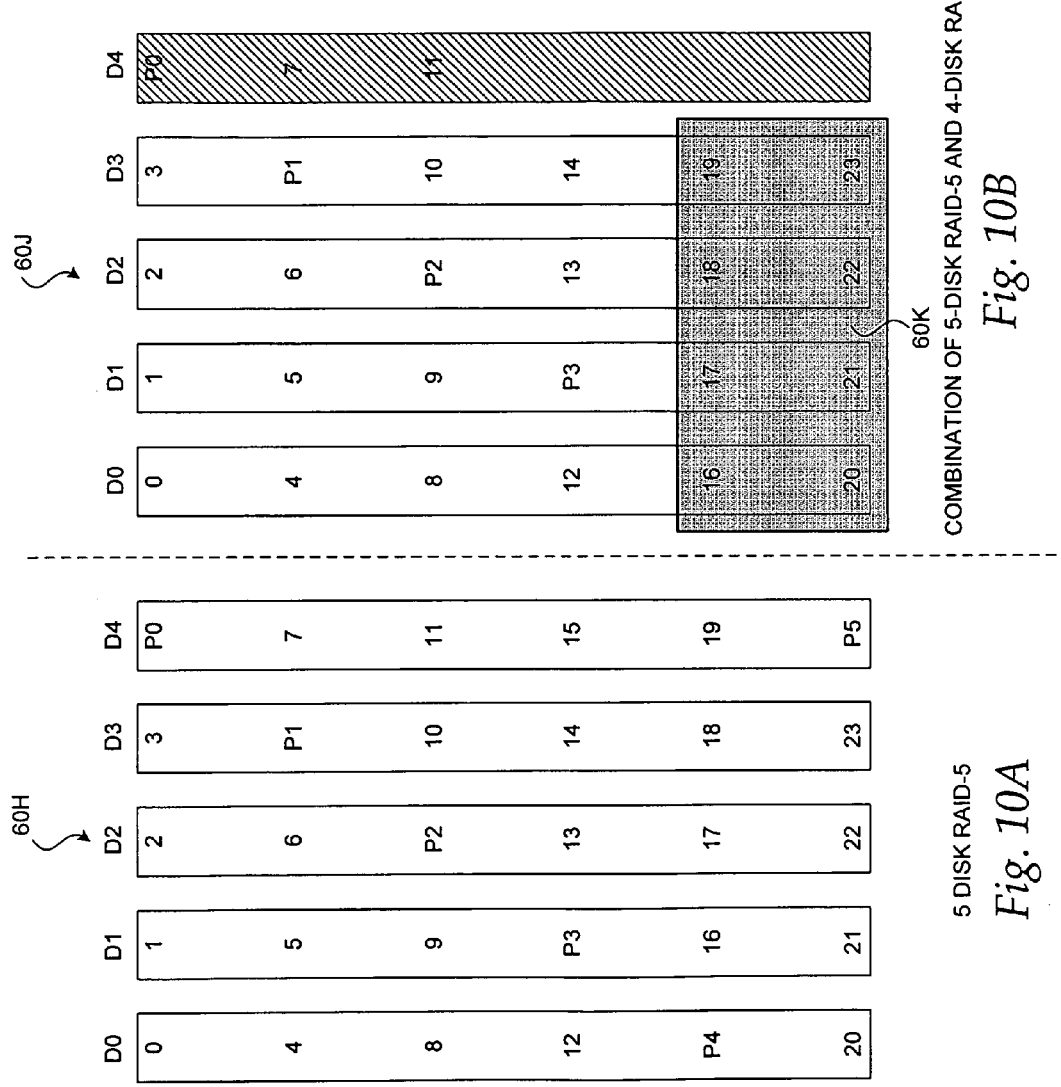
FIGS. 10A-10B is a block diagram illustrating the conversion of an array from RAID-5 to RAID-0 in response to the failure of a mass storage device.

Referring now to FIGS. 10A and 10B, additional details will be provided for improving the performance of arrays in the event of a drive failure that do not have a hot spare. In particular, FIG. 10A shows the arrangement of data on a five disk RAID-5 array 60H. The blocks on each of the disks are numbered consecutively and parity blocks are indicated with a "P." For instance, disk D4 stores parity blocks P0 and P5, disk D3 stores parity block P1, disk D2 stores parity block P2, disk D1 stores parity block P3, and disk D0 stores parity block P4. In the event of a disk failure, a hot spare may be utilized to rebuild the contents of any of the disks D0-D5 in the manner described above with respect to FIG. 9. However, if a hot spare is not available, the array must operate in degraded mode until the failed drive can be replaced. FIG. 10B illustrates a solution to this problem.

As shown in FIG. 10B, the array 60J may improve its performance rather than operating in degraded mode. This is accomplished by dynamically switching from RAID-5 to RAID-0 in the event of a drive failure, rather than switching to degraded RAID-5. The switch does not result in reduced redundancy because RAID-0 and degraded RAID-5 both offer no redundancy. RAID-0, however, is much faster than degraded RAID-5 because the parity is not calculated or stored. FIG. 10B illustrates the contents of the array 60J after the failure of the disk D4 following the storage of the block 14. The array 60K is a RAID-0 array, while the remainder of the array 60J is a RAID-5 array. Metadata is stored in a configuration area of the array to indicate the location at which the array was converted to RAID-0. Since the effective number of disks remains the same, the metadata that must be written to fully describe the change is minimal. When the failed disk is replaced, the RAID-0 array may be converted back to RAID-5 by calculating the appropriate parity blocks and writing them to the appropriate location.

Figure 11:
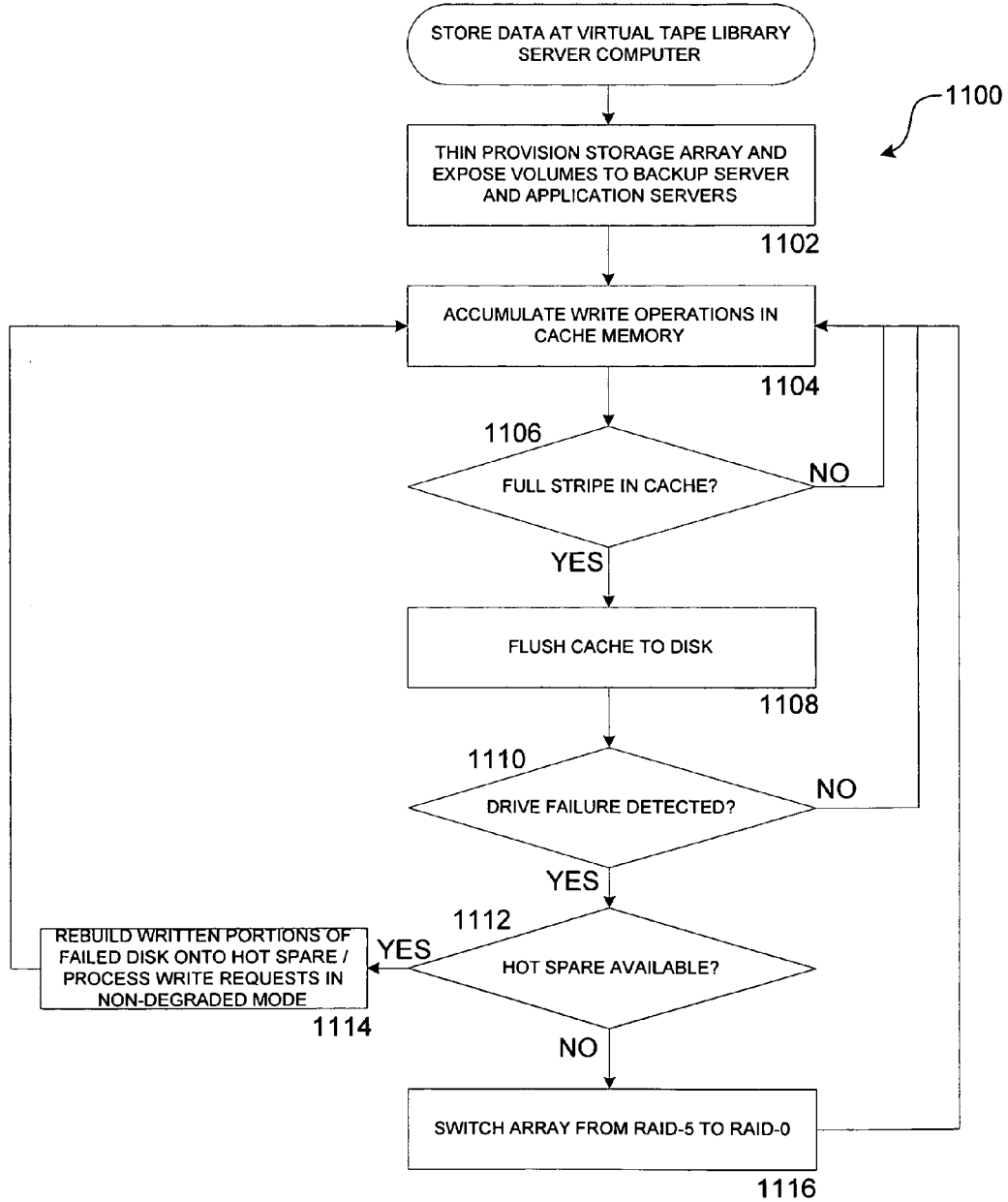
FIG. 11 is a flow diagram illustrating the operations of a VTL server computer.

Turning now to FIG. 11, additional details regarding the operation of the computer 2 for providing a virtual tape library will be provided. In particular, a routine 1100 will be described illustrating operations performed by the VTL server computer 2. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations presented below and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 1100 begins at operation 1102, where the storage array maintained by the VTL server computer 2 is thin provisioned and the volumes maintained on the array are exposed to the backup server 4 and the application servers 6A-6B. From operation 1102, the routine 1100 continues to operation 1104, where write operations are accumulated in the cache memory of the computer 2 in the manner described above with respect to FIG. 7. From operation 1104, the routine 1100 continues to operation 1106, where a determination is made as to whether a full stripe of data is contained in the cache. If not, the routine 1100 branches back to operation 1104, where additional writes are accumulated. If so, the routine 1100 continues to operation 1108, where a full stripe of data is flushed from the cache to the underlying disks.

From operation 1108, the routine 1100 continues to operation 1110, where a determination is made as to whether a failure has occurred on any of the disk drives of the array. If not, the routine 1100 branches back to operation 1104. If a failure has occurred, the routine 1100 continues to operation 1112, where a determination is made as to whether a hot spare disk drive is available. If a hot spare is available, the routine 1100 branches to operation 1114, where the written to portion of the failed drive is rebuilt onto the hot spare. New writes are processed in a non-degraded fashion as described above with respect to FIG. 9. From operation 1114, the routine 1100 returns to operation 1104.

If, at operation 1112, a determination is made that no hot spare is available, the routine 1100 continues to operation 1116. At operation 1116, the array is dynamically converted from a RAID-5 array to a RAID-0 array as described above with respect to FIG. 10B. In this manner, new writes received at the array before the failed disk drive is replaced and rebuilt are stored using RAID-0 . From operation 1116, the routine 1100 returns to operation 1104, described above.

It will be appreciated that the embodiments described herein provide a method, apparatus, system, and computer-readable medium for providing a virtual tape library server computer. Although the embodiments presented herein have been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for storing data at a virtual tape library server computer, the method comprising:
    receiving data write requests at the virtual tape library server computer, the data write requests directed to one or more volumes maintained by the virtual tape library server computer on an array of mass storage devices; and
    storing data for the write requests on the volumes of the array utilizing thin provisioning comprising
        sequentially allocating storage space on the array for write requests such that the data is capable of being stored sequentially on the array in the order that the write requests arrive at the volumes, and
    storing the data in the allocated storage space in the same order as the write requests arrive at the volumes by:
        providing a cache memory at the virtual tape library server computer at least the size of a full stripe of the array;
        caching the data for the write requests in the cache until a full stripe of data has been received; and
        in response to determining that a full stripe of data has been received, calculating a parity utilizing the contents of the cache directly, writing the contents of the cache and parity data associated with the parity to the array at one time, wherein the parity is only calculated for the full stripe of the array from the contents of the cache without reading data from the array, and flushing the contents of the cache after writing the contents of the cache to the array.

2. The method of claim 1, wherein the array further comprises a hot spare mass storage device and wherein the method further comprises:
    identifying a failed mass storage device in the array;
    in response to identifying the failed mass storage device, rebuilding only the written portions of the failed mass storage device onto the hot spare; and
    while the written portions of the failed mass storage device are being rebuilt, receiving write requests directed to unwritten portions of the array, and processing the write requests in a non-degraded manner.

3. The method of claim 1, wherein the array comprises a RAID-5 array, and wherein the method further comprises:
    detecting a failure of one of the mass storage devices of the array; and
    in response to detecting the failure, processing write requests for volumes on the array received after detecting the failure of the mass storage device using RAID-0.

4. The method of claim 3, further comprising:
    storing metadata in a configuration area of the array indicating a location on the array where the array was converted to a RAID-0 array.

5. A virtual tape library computer system, the computer system comprising:
    an array of mass storage devices storing one or more storage volumes maintained by the computer system;
    a cache memory for caching data to be stored on the array, the cache memory sized at least as large as a single stripe of the array;
    a central processing unit; and
    a memory storing computer-executable instructions which, when executed by the central processing unit, causes the computer system to receive data write requests directed toward the storage volumes of the array, to store the write requests in the cache, to calculate a parity utilizing the contents of the cache directly, to write the contents of the cache and parity data associated with the parity to the array at one time utilizing thin provisioning when the cache memory has accumulated data to fill a single stripe of the array, wherein the parity is only calculated for the full stripe of the array from the contents of the cache without reading data from the array, and to flush the contents of the cache after writing the contents of the cache to the array.

6. The virtual tape library computer system of claim 5, wherein the array further comprises a hot spare mass storage device and wherein the memory stores further computer-executable instructions which, when executed by the central processing unit, causes the computer system to identify a failed mass storage device in the array, in response thereto to rebuild only the written portions of the failed mass storage device onto the hot spare, and to process write requests directed to unwritten portions of the array and received while the rebuild is being performed in a non-degraded manner.

7. The virtual tape library computer system of claim 6, wherein the array comprises a RAID-5 array, and wherein the memory stores further computer-executable instructions which, when executed by the central processing unit, causes the computer system to detect a failure of one of the mass storage devices of the array and to process write requests received after detecting the failure using RAID-0.

8. The virtual tape library computer system of claim 7, wherein the memory stores further computer-executable instructions which, when executed by the central processing unit, causes the computer system to store metadata in a configuration area of the array indicating a location on the array where write requests began to be stored using RAID-0.

* * * * *